United States Patent
Brzozowski et al.

(10) Patent No.: US 11,861,988 B2
(45) Date of Patent: Jan. 2, 2024

(54) MULTI-STEP VALIDATION AND REDEMPTION FOR DIGITAL LOTTERY TICKETS

(71) Applicant: IGT GLOBAL SOLUTIONS CORPORATION, Providence, RI (US)

(72) Inventors: Zbigniew Brzozowski, Warsaw (PL); Gregory J. Spatuzzi, Cranston, RI (US); Thomas K. Oram, Hudson, MA (US)

(73) Assignee: IGT Global Solutions Corporation, Providence, RI (US)

(*) Notice: Subject to any disclaimer, the term of this patent is extended or adjusted under 35 U.S.C. 154(b) by 219 days.

(21) Appl. No.: 17/222,408

(22) Filed: Apr. 5, 2021

(65) Prior Publication Data
US 2022/0319270 A1  Oct. 6, 2022

(51) Int. Cl.
*G07F 17/32* (2006.01)
*G06Q 20/32* (2012.01)
*G06Q 20/38* (2012.01)
*G06Q 20/04* (2012.01)

(52) U.S. Cl.
CPC ....... *G07F 17/329* (2013.01); *G06Q 20/0457* (2013.01); *G06Q 20/3255* (2013.01); *G06Q 20/3274* (2013.01); *G06Q 20/385* (2013.01); *G07F 17/3225* (2013.01); *G07F 17/3244* (2013.01)

(58) Field of Classification Search
CPC ............... G07F 17/329; G07F 17/3225; G07F 17/3244; G06Q 20/0457; G06Q 20/3255; G06Q 20/3274; G06Q 20/385

USPC .......................................................... 463/17
See application file for complete search history.

(56) References Cited

U.S. PATENT DOCUMENTS

| | | | |
|---|---|---|---|
| 8,696,431 B2 | 4/2014 | Safaei et al. | |
| 9,076,133 B2 | 7/2015 | Kolios et al. | |
| 9,836,923 B2 | 12/2017 | Kolios et al. | |
| 9,997,026 B2 | 6/2018 | Martineck | |
| 11,721,176 B2 * | 8/2023 | Gotlieb | G07F 17/3255 463/17 |
| 2004/0166919 A1 | 8/2004 | Duhamel et al. | |
| 2008/0167060 A1 | 7/2008 | Moshir et al. | |
| 2009/0176549 A1 | 7/2009 | Saig et al. | |
| 2010/0069136 A1 | 3/2010 | Safaei et al. | |
| 2012/0202571 A1 | 8/2012 | Stanek et al. | |
| 2012/0244926 A1 | 9/2012 | Kolios et al. | |
| 2013/0012286 A1 | 1/2013 | Schuff | |
| 2013/0012288 A1 | 1/2013 | Nordby et al. | |
| 2015/0046285 A1 | 2/2015 | Baazov | |
| 2015/0194008 A1 * | 7/2015 | Kolios | G06Q 20/326 463/17 |
| 2016/0012465 A1 * | 1/2016 | Sharp | G06Q 20/321 705/14.17 |
| 2019/0272704 A1 | 9/2019 | Lemay et al. | |

(Continued)

FOREIGN PATENT DOCUMENTS

WO  WO-2012100353 A1 *  8/2012  ............. A63F 3/081

*Primary Examiner* — Allen Chan
(74) *Attorney, Agent, or Firm* — Neal, Gerber & Eisenberg LLP (57) ABSTRACT

A system and method for facilitating the purchase of digital lottery tickets, the validation of digital lottery tickets, and the redemption of digital lottery tickets. The systems and methods provide improved security and protection against fraudulent validation and redemption of digital lottery tickets.

20 Claims, 6 Drawing Sheets

(56) References Cited

U.S. PATENT DOCUMENTS

2019/0340865 A1\* 11/2019 Martineck, Sr. ...... G07F 17/329
2021/0241575 A1 8/2021 Shepherd et al.

\* cited by examiner

MULTI-STEP VALIDATION AND REDEMPTION FOR DIGITAL LOTTERY TICKETS

The present disclosure relates to digital lottery tickets, and more particularly to multi-step digital lottery ticket validation and redemption systems and methods. Digital lottery ticket systems may enable player to purchase digital lottery tickets. Digital lottery ticket systems also may enable player to redeem such digital lottery tickets, and may require various types security layers associated with such redemption.

BRIEF SUMMARY

In various embodiments, the present disclosure relates to a digital lottery ticket system including a processor and a memory device storing a plurality of instructions that when executed by the processor, cause the processor to receive, via a first electronic communications network, a player ticket validation request from a lottery system access terminal, the player ticket validation request comprising data associated with data obtained from an image of a digital lottery ticket displayed by a player mobile electronic access device, and responsive to receiving the player ticket validation request, determine if the digital lottery ticket is valid and redeemable. The plurality of instructions, when executed by the process further cause the processor to, responsive to determining that the digital lottery ticket is valid and redeemable, create and send, via a second electronic communications network, a ticket validation SMS with data representing a one-time code to the player mobile electronic access device, and receive, via the first electronic communications network, a player ticket redemption request from the lottery system access terminal, the player ticket redemption request comprising data representing a digital lottery ticket identification, the one-time code, and a player code. The plurality of instructions, when executed by the process further cause the processor to, responsive to receiving the player ticket redemption request, determine based on the data representing the digital lottery ticket identification, the one-time code, and the player code, whether to approve or deny the player ticket redemption request, and responsive to determining to approve the player ticket redemption request, create and send, via the first electronic communications network, a ticket redemption approval to the access terminal to approve payment of an award for the digital lottery ticket.

In various other embodiments, the present disclosure relates to a method of operating a digital lottery ticket system, said method including, responsive to receiving, via a first electronic communications network, a player ticket validation request from a lottery system access terminal, the player ticket validation request comprising data associated with data obtained from an image of a digital lottery ticket displayed by a player mobile electronic access device, determining if the digital lottery ticket is valid and redeemable. The method further includes, responsive to determining that the digital lottery ticket is valid and redeemable, creating and sending, via a second electronic communication network, a ticket validation SMS with data representing a one-time code to the player mobile electronic access device. The method further includes, responsive to receiving, via the first electronic communication network, a player ticket redemption request from the lottery system access terminal, the player ticket redemption request comprising data representing a digital lottery ticket identification, the one-time code, and a player code, determining based on the data representing the digital lottery ticket identification, the one-time code, and the player code, whether to approve or deny the player ticket redemption request. The method further includes, responsive to determining to approve the player ticket redemption request, creating and sending, via the first electronic communication network, a ticket redemption approval to the access terminal to approve payment of an award for the digital lottery ticket.

In various other embodiments, the present disclosure relates to a digital lottery ticket system access terminal including a processor and a memory device storing a plurality of instructions that when executed by the processor, cause the processor to create a player ticket validation request comprising data associated with data obtained from an image of a digital lottery ticket displayed by a player mobile electronic access device; and send, via a first electronic communications network, the player ticket validation request to a central server of a digital lottery ticket system for a determination of whether the digital lottery ticket is valid and redeemable. The plurality of instructions, when executed by the process further cause the processor to, create a player ticket redemption request comprising data representing a digital lottery ticket identification, a one-time code, and a player code, and send, via the first electronic communications network, the player ticket redemption request to the central server of the digital lottery ticket system. The plurality of instructions, when executed by the process further cause the processor to, responsive to receiving a ticket redemption approval, via the first electronic communication network, display an indication of an approval of a payment of an award for the digital lottery ticket.

Additional features are described in, and will be apparent from, the following Detailed Description and the figures.

DETAILED DESCRIPTION

Digital Lottery Ticket System Configuration

Various embodiments of the present disclosure relate to digital lottery ticket systems and methods configured to enable the purchase of digital lottery tickets, the validation of digital lottery tickets, and the redemption of digital lottery tickets. The digital lottery ticket systems and methods of various embodiments of the present disclosure provide improved security and protection against fraudulent validation and redemption of digital lottery tickets.

The digital lottery ticket systems and methods of various embodiments of the present disclosure enable the purchase, validation, and redemption of a plurality of digital lottery tickets for a plurality of plays of a plurality of lottery games by a plurality of players. For brevity and simplicity, the digital lottery ticket systems and methods of the present disclosure are described herein primarily in relation to a purchase of a single digital lottery ticket for a single play of a single lottery game by a single player, and a validation and redemption of that single digital lottery ticket for that single play of that single lottery game by that single player. It should be appreciated this is not meant to limit the scope of the present disclosure.

In various embodiments of the present disclosure, the digital lottery ticket system of the present disclosure enables a player to use their own mobile electronic access devices (such as but not limited to a player mobile telephone) in connection with the purchase, the validation, and the redemption of a digital lottery ticket. While a player mobile telephone is used as a primary example of the player mobile electronic access device herein for brevity and simplicity, it should be appreciated this is not meant to limit the scope of the present disclosure. Specifically, it should be appreciated that the player mobile electronic access device can include any suitable mobile access device having an access number such as a telephone number. Other examples of such access devices (with cellular communication capabilities) are a portable computer, a tablet computer, a personal digital assistant, and a watch.

In various embodiments of the present disclosure, to use the digital lottery ticket system, a player must first access a suitable website associated with the digital lottery ticket system via an Internet browser of the player's mobile telephone, and/or download and execute a suitable application (commonly called an "app") associated with the digital lottery ticket system on the player mobile telephone. After doing so, the player can use the player mobile telephone to purchase a digital lottery ticket for a play of a lottery game provided by the digital lottery ticket system, and to validate and redeem that digital lottery ticket (assuming that digital lottery ticket is a valid winning digital lottery ticket as described below).

In various embodiments of the present disclosure, the digital lottery ticket system and method requires a player to use the player mobile telephone to purchase, validate, and redeem all of the digital lottery tickets provided by the digital lottery ticket system. In various such embodiments of the present disclosure, the digital lottery ticket system requires a player to provide only a minimal amount of player related information to use the digital lottery ticket system. Such minimal amount of information can include, for example: a player identification, a player residence or location, a telephone number of the player mobile telephone, a player's age, and player designated data such as a player personal identification code (referred to herein as a "PIN") for the purchase a digital lottery ticket provided by the digital lottery ticket. In other embodiments, less that these listed attributes may be required, and thus the present disclosure contemplates that the digital lottery ticket system and method collects minimal player attributes and handles security through the more secure digital lottery ticket validation and redemption process described herein to verify that the respective digital lottery ticket belongs to the respective player. In various embodiments, the digital ticket lottery system requires the player to use that player mobile telephone to validate and redeem that digital lottery ticket through the digital lottery ticket system. It should thus be appreciated that one of the technical advantages of the digital lottery ticket system of the present disclosure is that only a minimal amount of player information is needed from the player for operation of the system and method.

In various embodiments of the present disclosure, the digital lottery ticket system includes one or more central servers (including their respective processor(s) and database(s)). In various embodiments of the present disclosure, the digital lottery ticket system includes one or more central servers that store(s) various data for each play of a lottery game as further described herein. In various embodiments of the present disclosure, the digital lottery ticket system includes one or more central servers that store(s) various player specific data for each player that registers with and uses the digital lottery ticket system, as described herein. These central servers can be the same central server, different central servers, or multiple central servers in accordance with the present disclosure. For brevity and simplicity, one central server is discussed herein for both of these purposes, but it this is not meant to limit the scope of the present disclosure.

Figure 1:
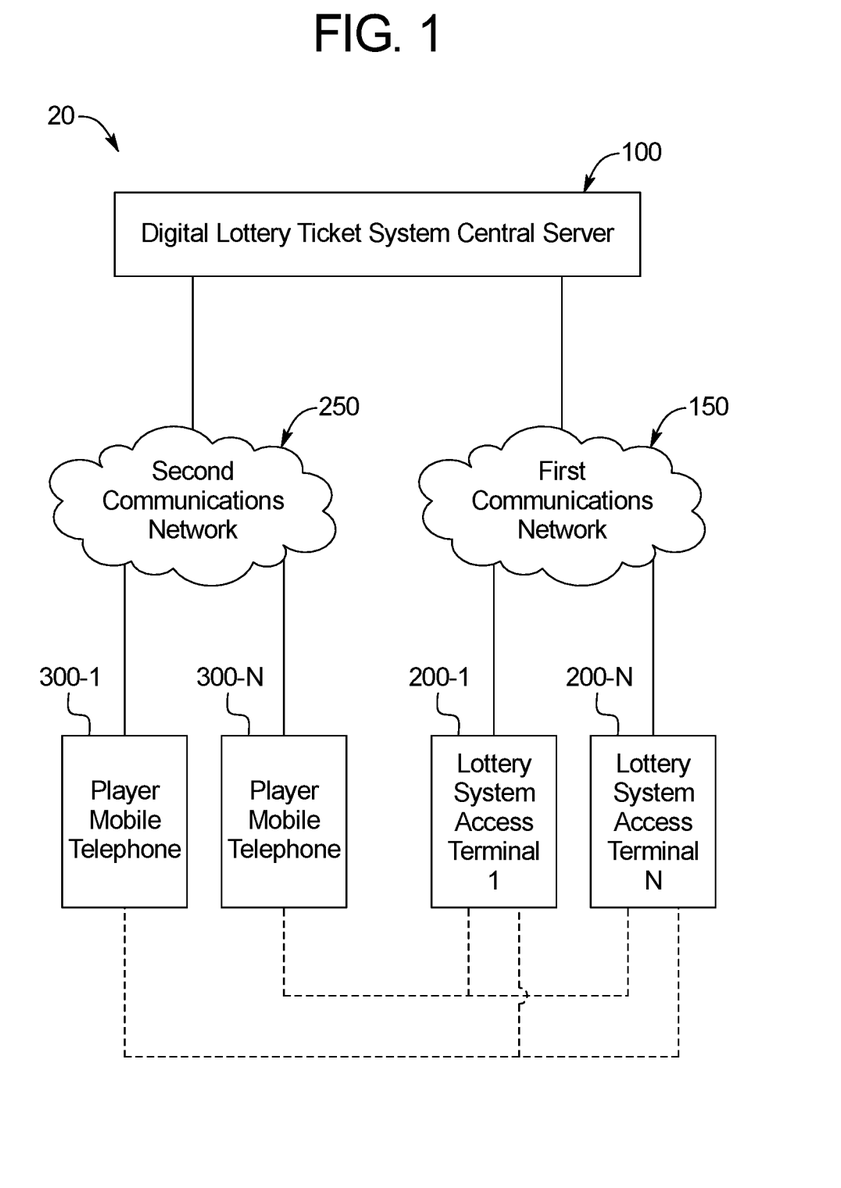
FIG. 1 is a schematic diagram of a digital lottery ticket system of one example embodiment of the present disclosure, and which includes a central server and a plurality of lottery ticket terminals configured to co-act with a plurality of player mobile telephones to enable players to purchase, validate, and redeem digital lottery tickets.

Turning now to the figures, FIG. 1 generally illustrates a digital lottery ticket system 20 of one example embodiment of the present disclosure. This example digital lottery ticket system 20 generally includes: (1) a lottery system central server 100; and (2) a plurality of lottery system access terminals 200-1 to 200-N configured to communicate with the central server 100 via a suitable first electronic communications network 150. For brevity and simplicity, the digital lottery ticket central server 100 is sometimes referred to herein as the central server, and the lottery system access terminals 200-1 to 200-N are sometimes referred to herein as the access terminals, but this is not meant to limit the scope of the present disclosure. The central server 100 is also configured to communicate with a plurality of lottery player mobile telephones 300-1 to 300-N via a suitable second electronic communications network 250. In this example embodiment, the first electronic communications network 150 is a secure data network (that may use suitable encryption) and the second electronic communications network 250 is a cellular data network (that may use suitable encryption). These different networks may vary in accordance with the present disclosure. The plurality of access terminals 200-1 to 200-N are configured to suitably interact with the plurality of player mobile telephones 300-1 to 300-N such as described herein. In the example embodiments described below, the plurality of lottery system access terminals 200-1 to 200-N do not electronically communicate with the plurality of player mobile telephones 300-1 to 300-N via any electronic communication network (as indicated by the dotted line in FIG. 1); however, in alternative embodiments, the plurality of access terminals 200-1 to 200-N may communicate with the plurality of player mobile telephones 300-1 to 300-N via a suitable electronic communication network.

In this example embodiment of the present disclosure, each lottery system access terminal 200-1 to 200-N corresponds to (or is associated with) a particular lottery retailer. For example, the lottery system access terminal 202-1 of FIG. 1 may be physically located at and associated with a first lottery retailer (such as a convenience store), and the lottery system access terminal 200-N may be physically located at and associated with a second lottery retailer (such as a supermarket). It should be appreciated that any suitable quantity of lottery system access terminals may be employed in the digital lottery ticket system 20, along with any suitable quantity of corresponding lottery central servers 100. It should also be appreciated that in various embodiments of the present disclosure, a player may purchase, validate, and redeem a digital lottery ticket from the digital lottery ticket system 20 via interaction with any single lottery system access terminal at any retailer location, as further described below. It should also be appreciated that a player may purchase a digital lottery ticket of the digital lottery ticket system 20 via interaction with any one of the lottery system access terminal 200-1 to 200-N at any retailer location, and then that player may subsequently validate and redeem that purchased digital lottery ticket via interaction with another one of the lottery system access terminals 200-1 to 200-N.

In various embodiments of the present disclosure, the central server 100 is configured to receive, store, and use suitable lottery game and lottery game access terminal data representing or regarding, for example: (1) a lottery game and the rules and awards therefor; (2) each play of the lottery game; (3) the available digital lottery tickets for each play of the lottery game; (4) the access terminals that are able to sell the digital lottery tickets to players (such as but not limited to identification of the retailers and their access terminals); and (5) the access terminals that are able to facilitate the validation and redemption of winning digital lottery tickets (such as but not limited to identification of the retailers and their access terminals). It should be appreciated that the central server 100 can store such data in any suitable databases and in any suitable manner, and that the central server 100 can store more, less, or alternative data in accordance with the present disclosure.

In various embodiments of the present disclosure, the central server 100 is also configured to receive, store, and use suitable player data for each player including, for example, data representing or regarding, for example: (1) a player's name (provided by the player); (2) a player identification number ("ID") (determined by the central server 100); (3) a player's address or state of residence (provided by the player); (4) a player mobile telephone number for the player mobile telephone (provided by the player); (5) a player PIN (selected by the player); and/or (6) the player's age. As mentioned above, in various embodiments, this data is minimal. This enables the central server 100 to associate the player with and identify the player for each digital lottery ticket purchased at an access terminal at a retailer location. As mentioned above, the digital lottery ticket system 20 is configured to obtain this information at a suitable time such as: (a) via a suitable player registration method of the digital lottery ticket system (such as via a website and/or an app as mentioned above) prior to the player purchasing any digital lottery tickets; or (b) via a suitable player registration method of the digital lottery ticket system in connection with the player purchasing a first digital lottery ticket.

In various embodiments of the present disclosure, the player registration method is provided for each player via that player's mobile telephone as mentioned above. In other embodiments of the present disclosure, the player registration method is alternatively or additionally provided for each player via a suitable web site. In other embodiments, the player registration method is alternatively or additionally provided for each player through a telephone call center associated with the digital lottery ticket system 20. Player registration may also be provided through a lottery system access terminal. As mentioned above, the player registration method can require the player to provide the player's name, residence, age, mobile telephone number, and the player PIN. It should also be appreciated that in various embodiments, the player registration method may: (a) require the player to acknowledge and agree to certain rules for the plays of the digital lottery games and for use of the digital lottery ticket system 20; (b) require the player to acknowledge and agree to enable automatic location verification of the player and/or the player's mobile telephone for use of the digital lottery ticket system 20; and/or (c) require the player to provide other suitable information or acknowledgements.

Digital Lottery Ticket Purchase Method

In various embodiments, the digital lottery ticket system 20 is configured to provide a suitable digital lottery ticket purchase method that enables a player to purchase a digital lottery ticket for a play of a lottery game via interaction with one of the access terminals 200-1 to 200N at one of the lottery retailers. The digital lottery ticket system purchase method requires the player to provide certain player data and particularly the player's mobile telephone number (that the player has registered with the system 20) in association with the purchase of the digital lottery ticket via that access terminal at that lottery retailer. The digital lottery ticket system 20 can be configured to enable the purchase of a digital lottery ticket at an access terminal in any suitable manner.

In various other embodiments, the digital lottery ticket system 20 is alternatively or additionally configured to provide a suitable digital lottery ticket purchase method that enables a player to purchase a digital lottery ticket for a play of a lottery game via without interaction with one of the access terminals 200-1 to 200N. This electronic digital lottery ticket system purchase method requires the player to provide certain player data and particularly the player's mobile telephone number (that the player has registered with the system 20) in association with the purchase of the digital lottery ticket via an online access system. The digital lottery ticket system 20 can be configured to enable the purchase of a digital lottery ticket through an online access in any suitable manner. Such purchase will include a suitable payment process.

Figure 2:
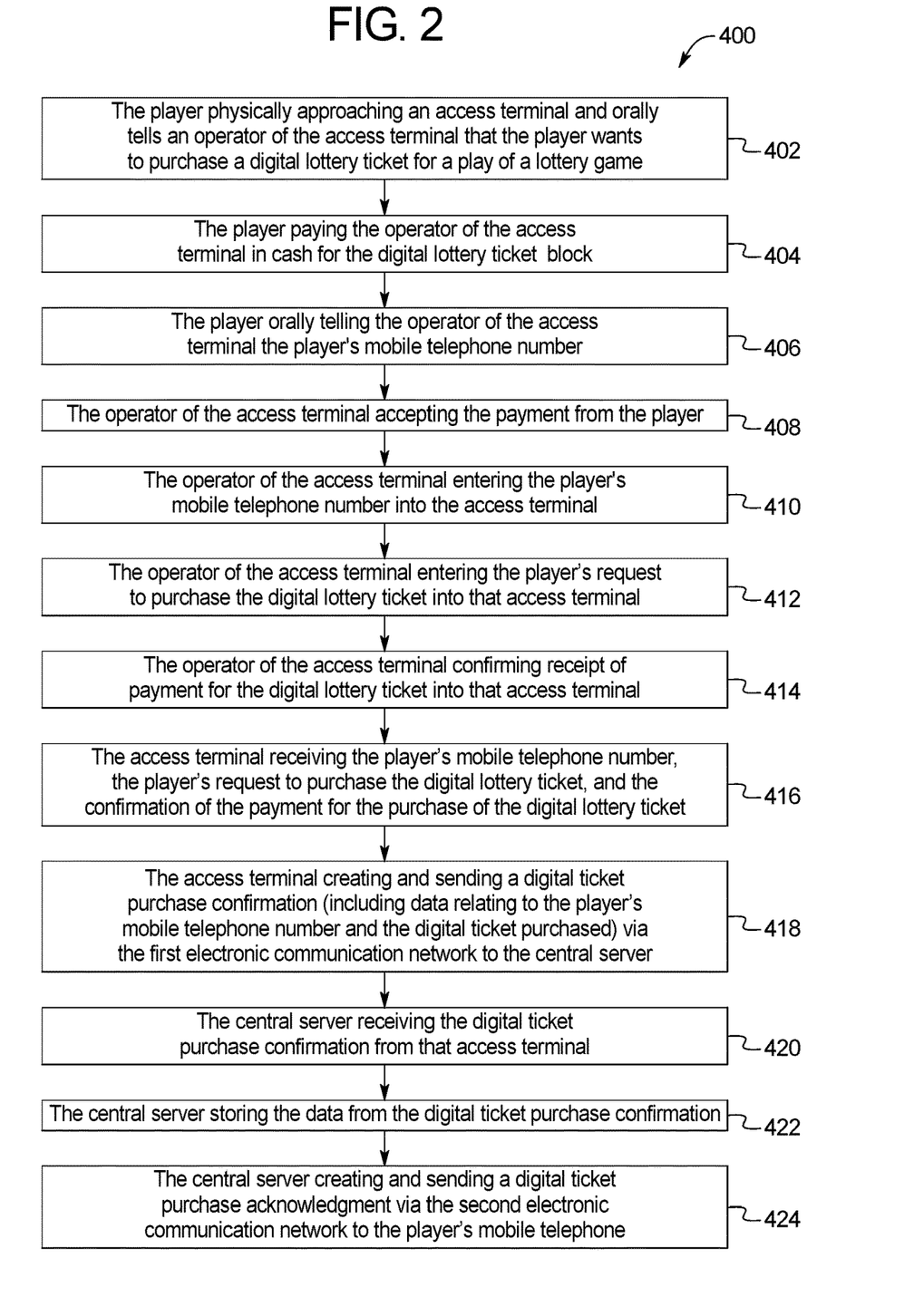
FIG. 2 is a flow chart showing part of a digital lottery ticket purchase method of one example embodiment of the present disclosure.

In various embodiments, after a first player registration, the digital lottery ticket purchasing process at a terminal may be simplified for further purchases by using player mobile telephone display to display a scannable code (such as by a barcode reader) from the mobile app that provides or enables access to the required player attributes associated with the player Referring now to FIG. 2, one example digital lottery ticket purchase method of the present disclosure at an access terminal is generally shown and indicated by numeral 400. This example includes: (1) the player physically approaching an access terminal and orally telling an operator of the access terminal that the player wants to purchase a digital lottery ticket for a play of a lottery game, as indicated by block 402; (2) the player paying the operator of the access terminal in cash for the digital lottery ticket, as indicated by block 404; (3) the player orally telling the operator of the access terminal the player mobile telephone number, as indicated by block 406; (4) the operator of the access terminal accepting the payment from the player, as indicated by block 408; (5) the operator of the access terminal entering the players mobile telephone number into the access terminal, as indicated by block 410; (6) the operator of the access terminal entering the player's request to purchase the digital lottery ticket into that access terminal, as indicated by block 412; (7) the operator of the access terminal confirming receipt of payment for the digital lottery ticket into that access terminal, as indicated by block 414; (8) the access terminal receiving the player's mobile telephone number, the player's request to purchase the digital lottery ticket, and the confirmation of the payment for the purchase of the digital lottery ticket, as indicated by block 416; (9) the access terminal creating and sending a digital ticket purchase confirmation (including data relating to the player mobile telephone number and the digital ticket purchased) via the first electronic communication network 150 to the central server, as indicated by block 418; (10) the central server receiving the digital ticket purchase confirmation from that access terminal, as indicated by block 420; (11) the central server storing the data from the digital ticket purchase confirmation, as indicated by block 422; and (12) the central server creating and sending a digital ticket purchase acknowledgment via the second electronic communication network to the player mobile telephone, as indicated by block 424. The digital ticket purchase confirmation and the digital ticket purchase acknowledgment can each be in the form of one or more electronic data packets or other suitable format. In various embodiment, the digital ticket purchase process may also include the player requesting a digital ticket after a paper lottery ticket is printed.

Figure 3:
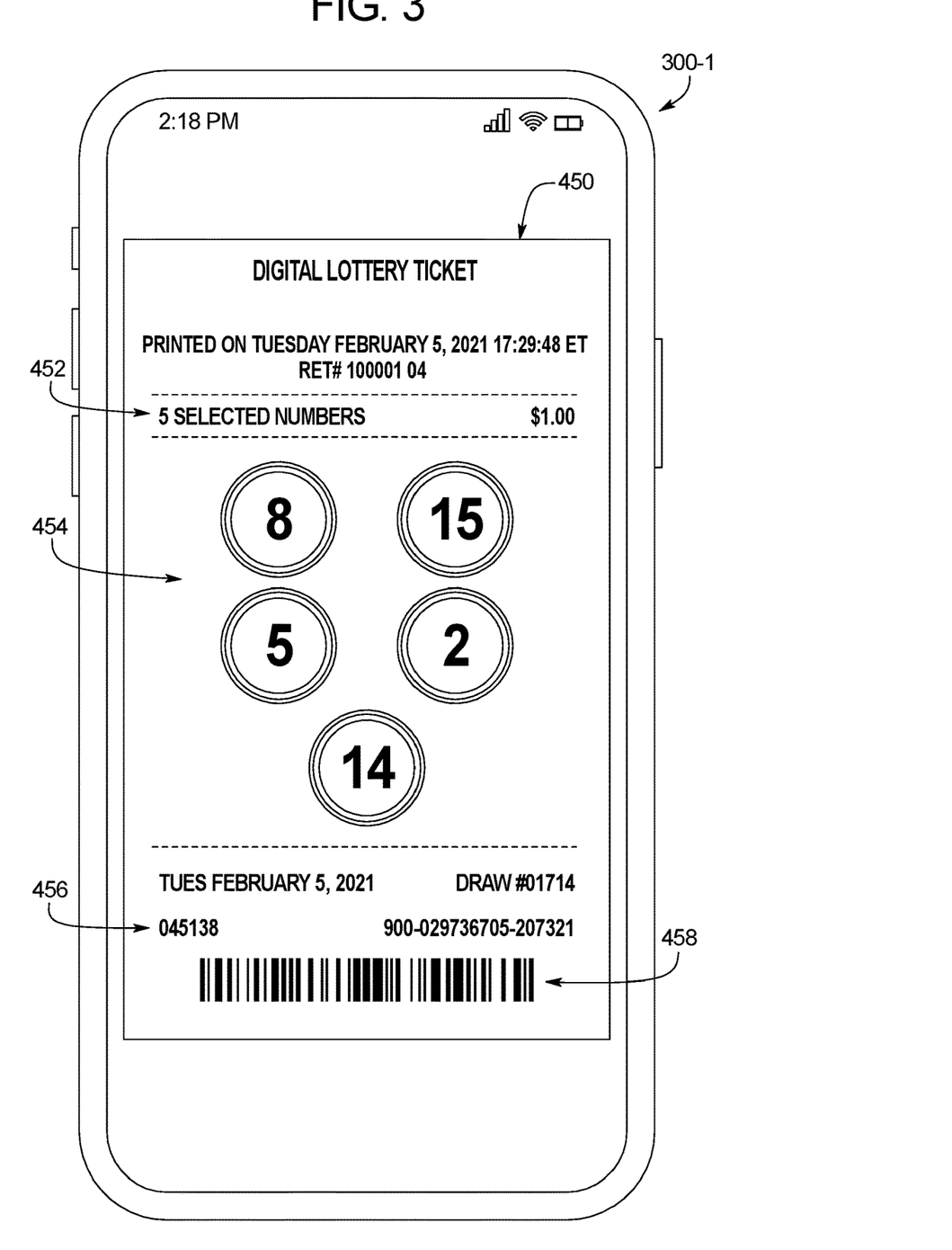
FIG. 3 is a front view of a player mobile telephone displaying an example digital lottery ticket image created by the digital lottery ticket system of one example embodiment of the present disclosure and that is sent to, downloadable on, and displayable by the player mobile telephone.

In various embodiments, the digital ticket purchase acknowledgment includes data representing an image of the digital lottery ticket that is downloadable on and displayable by the player mobile telephone. An example digital lottery ticket image 450 downloadable on and displayable by a player mobile telephone 300-1 is shown in FIG. 3. In this example embodiment, the digital lottery ticket image 450 includes a wager summary portion 452, a selected symbols portion 454, and a digital lottery ticket identifier portion 456. This digital lottery ticket identifier portion 456 in this example includes a bar code 458 that is associated with the digital lottery ticket and that enables identification of this digital lottery ticket. It should be appreciated that in various embodiments, the lottery ticket image may include additional or alternative information and/or codes. It should also be appreciated that the image of the digital lottery ticket provided by the digital lottery ticket system of the present disclosure may be alternatively configured.

It should further be appreciated that one or more of the above example steps of the digital lottery ticket purchase method may vary in accordance with the present disclosure. Such variations can include, for example: (a) the player using the access terminal to directly select the digital lottery ticket or portions thereof; (b) the player paying for the digital lottery ticket using an electronic payment system or method; (c) the player using the access terminal to enter the player mobile telephone number; and/or (d) the operator of the access terminal using a scanning device of the access terminal to enter the player telephone number into the access terminal. Thus, the digital lottery ticket purchase method may vary in accordance with the present disclosure.

In various embodiments of the present disclosure, the central server 100 is configured to receive, store, and use specific purchased digital lottery ticket data including an identification number for the purchased digital lottery ticket and an association with the specific player data for the player that purchased that digital lottery ticket. In various embodiments of the present disclosure, the digital lottery ticket system associates the purchase transaction in the central server 100 including certain data from the digital lottery ticket and the associated player data in an encrypted format (such as using a key stored on the central server or signed using a suitable hardware security module).

Digital Lottery Ticket Validation and Redemption Method

The digital lottery ticket system 20 and method of operation facilitates digital lottery ticket validation and redemption that enables a player to redeem a winning digital lottery ticket for a play of a lottery game that the player has purchased via the above described purchase method or another suitable purchase method. In various embodiments of the present disclosure, the lottery ticket validation and redemption method of the digital lottery ticket system 20 requires the player to have and provide the originally used player mobile telephone number for the validation and redemption of a winning digital lottery ticket at any access terminal 200-1 to 200-N of the digital lottery ticket system 20.

Figure 4A:
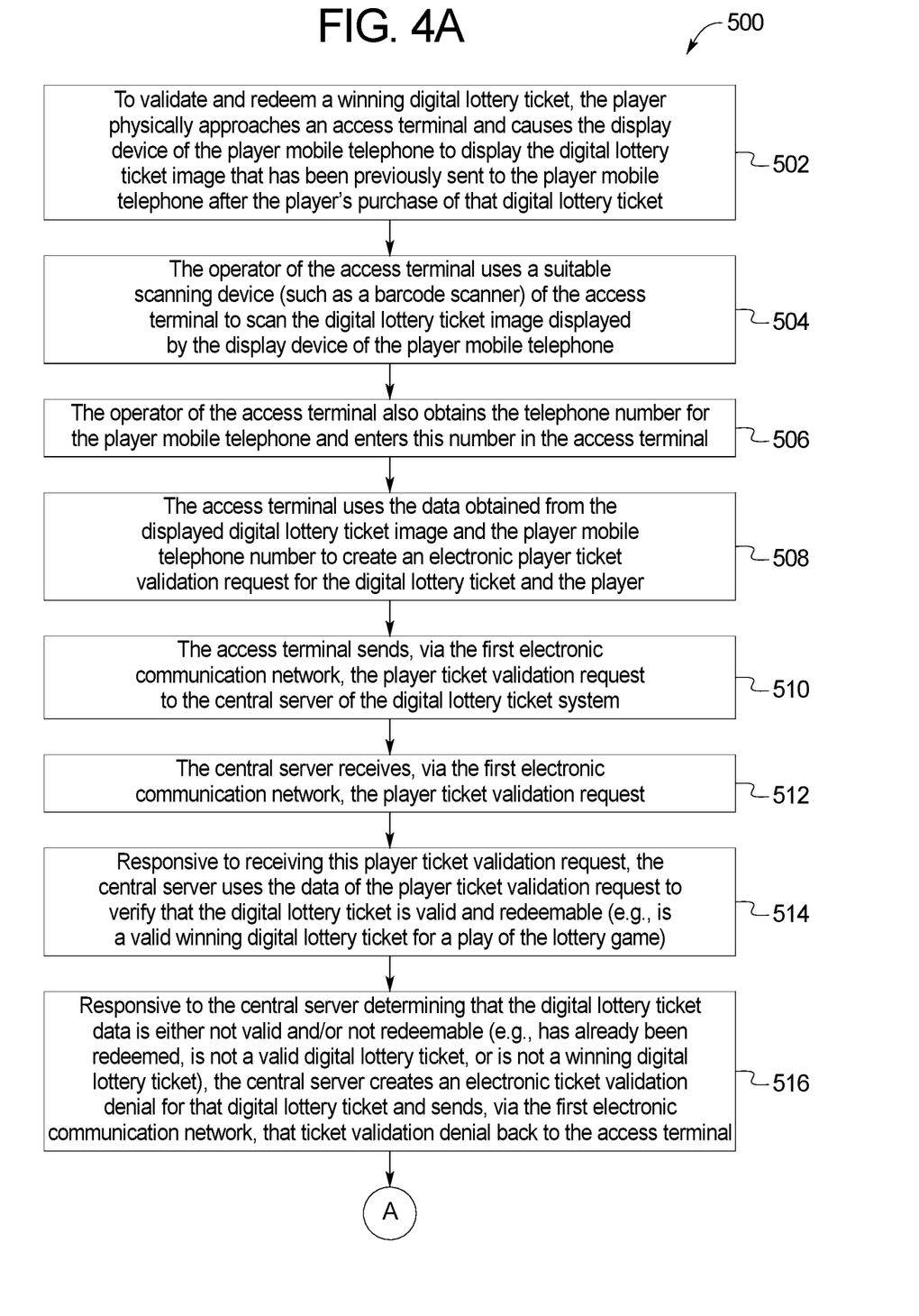
FIGS. 4A, 4B, and 4C are a flow chart showing parts of a digital lottery ticket validation and redemption method of one example embodiment of the present disclosure.
Figure 4B:
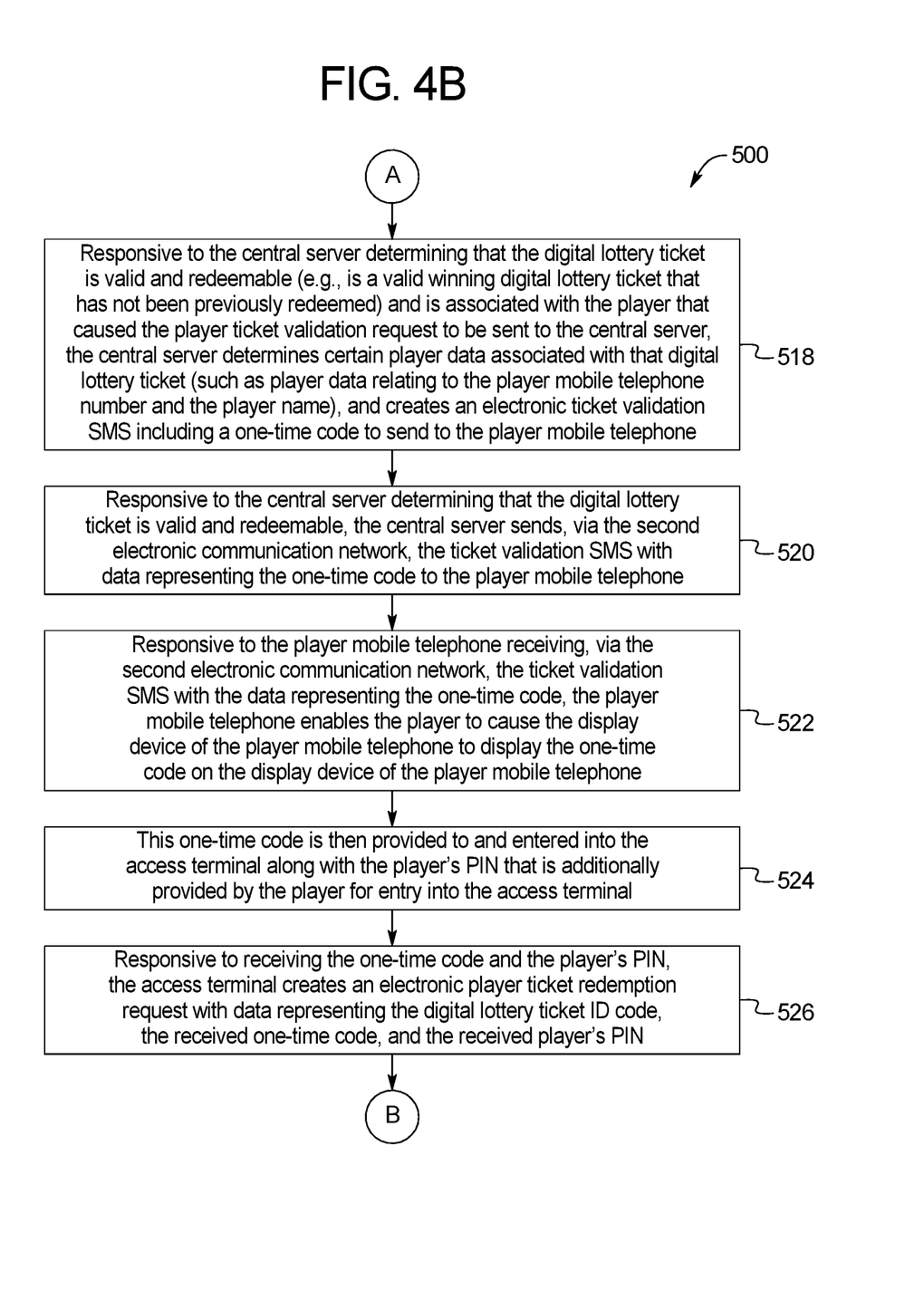
Figure 4C:
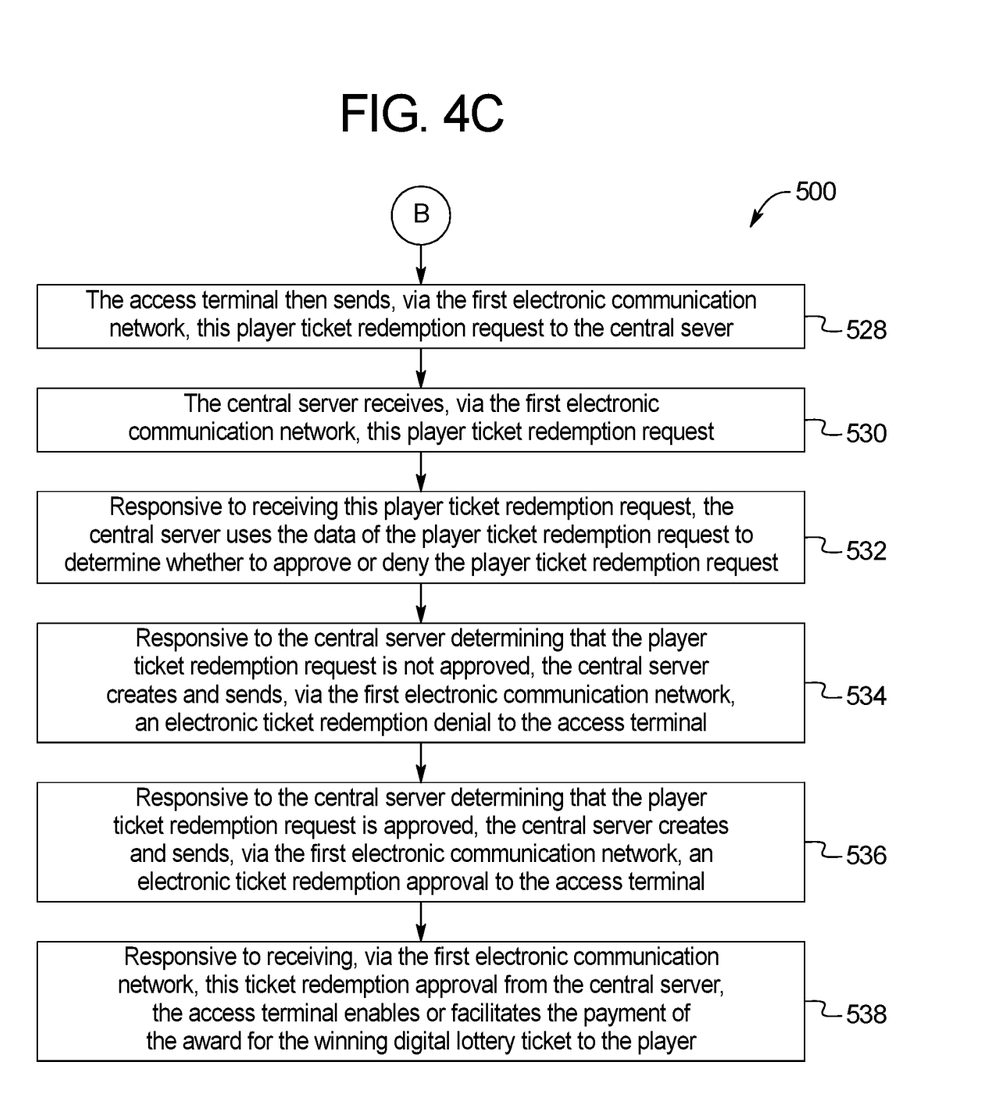

More specifically, the digital lottery ticket system 20 provides a multi-step validation and redemption method for each winning digital lottery ticket, wherein the method employs the player mobile telephone to validate and to redeem a winning digital lottery ticket at an access terminal at a lottery retailer. This example multi-step method for validating and redeeming a winning digital lottery ticket at an access terminal is generally shown in FIGS. 4A, 4B, and 4C, indicated by numeral 500, and described in further detail below. It should be appreciated that in various embodiments, one or more of these steps may be varied or removed such as but not limited to as provided below.

More specifically, to validate and redeem a winning digital lottery ticket, the player physically approaches an access terminal and causes the display device of the player mobile telephone to display the digital lottery ticket image that has been previously sent to the player mobile telephone after the player's purchase of that digital lottery ticket, as indicated by block 502. The digital lottery ticket may be a winning digital lottery ticket, if for example, a designated quantity of symbols of the lottery ticket match a designated quantity of randomly drawn symbols in a draw for the lottery game for which that digital lottery ticket is purchased. It should be appreciated that the digital lottery ticket can be for any suitable lottery game and may be of any suitable form in accordance with the present disclosure.

The operator of the access terminal uses a suitable scanning device (such as a barcode scanner) of the access terminal to scan the digital lottery ticket image displayed by the display device of the player mobile telephone, as indicated by block 504. It should be appreciated that in other example embodiments, the access terminal does not need to be operated by a human operator and the interaction between the player and/or the player mobile telephone and the access terminal can be conducted without such interaction.

In certain embodiments, the operator of the access terminal also obtains the telephone number for the player mobile telephone and enters this number in the access terminal, as indicated by block 506. It should be appreciated that the entry of the player telephone number can be accomplished in any suitable manner such as but not limited to a display and scanning process, a direct player entry process, or another suitable manner. In alternative embodiments, step 506 in Figure A is not required. In such embodiments, the player telephone number is embedded and encrypted inside the data associated with the digital lottery ticket (either in the ticket barcode or in the data in the central server associated with the digital lottery ticket identified by the barcode). This alternative embodiment makes the process more secure.

In certain embodiments, the access terminal uses the data obtained from the displayed digital lottery ticket image and the player mobile telephone number to create an electronic player ticket validation request for the digital lottery ticket and the player, as indicated by block 508. This player ticket validation request includes data representing the digital lottery ticket such as the digital lottery ticket identification (ID) code and the player mobile telephone number. This player ticket validation request can be in the form of one or more electronic data packets or other suitable format. In alternative embodiments where the player telephone number is embedded and encrypted inside the data associated with the digital lottery ticket, the access terminal uses the data obtained from the displayed digital lottery ticket image including the player mobile telephone number to create an electronic player ticket validation request for the digital lottery ticket and the player.

The access terminal sends, via the first electronic communication network, the player ticket validation request to the central server of the digital lottery ticket system, as indicated by block 510.

The central server receives, via the first electronic communication network, the player ticket validation request, as indicated by block 512. As indicated above, this player ticket validation request includes data representing the digital lottery ticket such as the digital lottery ticket ID code and the player mobile telephone number. In alternative embodiments, the central server can just use the digital lottery ticket ID and the player telephone number would be stored by the central server in the data associated with this digital lottery ticket ID.

Responsive to receiving this player ticket validation request, the central server uses the data of the player ticket validation request to verify that the digital lottery ticket is valid and redeemable (e.g., is a valid winning digital lottery ticket for a play of the lottery game), as indicated by block 514. This verification process may include, for example, the following determinations: (1) that the referenced digital lottery ticket is valid; (2) that the referenced digital lottery ticket has not already been redeemed; and (3) that the referenced digital lottery ticket is associated with the player via with player mobile telephone number.

Responsive to the central server determining that the digital lottery ticket data is either not valid and/or not redeemable (e.g., has already been redeemed, is not a valid digital lottery ticket, or is not a winning digital lottery ticket), the central server creates an electronic ticket validation denial for that digital lottery ticket and sends, via the first electronic communication network, that ticket validation denial back to the access terminal, as indicated by block 516. This ticket validation denial includes data representing the digital lottery ticket such as the digital lottery ticket identification (ID) code and the player telephone number. This ticket validation denial can be in the form of one or more electronic data packets or other suitable format. This ticket validation denial causes the access terminal or the operator of the access terminal to inform the player that the digital lottery ticket is not valid and the reason therefore. It should be appreciated that in such case, a suitable dispute resolution process can be provided. It should also be appreciated that for large awards over a certain amount, the player may need to present the digital lottery ticket for validation and redemption at a specific processing center, and that if the player tries to redeem such a winning digital lottery ticket in the manner described herein, such redemption may be denied by the digital lottery ticket system. It should also be appreciated that this ticket validation approval process can be repeated a designated quantity of times in case there is an error.

Responsive to the central server determining that the digital lottery ticket is valid and redeemable (e.g., is a valid winning digital lottery ticket that has not been previously redeemed) and is associated with the player that caused the player ticket validation request to be sent to the central server, the central server determines certain player data associated with that digital lottery ticket (such as player data relating to the player mobile telephone number and the player name), and creates an electronic ticket validation SMS including a one-time code to send to the player mobile telephone, as indicated by block 518. This ticket validation SMS can be in the form of one or more electronic data packets or other suitable format. The central server also validates the digital lottery ticket in the digital lottery ticket system. In certain embodiments of the present disclosure, the central server also creates an electronic ticket validation approval for the digital lottery ticket, and sends, via the first electronic communication network, that ticket validation approval back to the access terminal so that the access terminal and operator thereof know that the digital lottery ticket has been validated, and that the access terminal and operator should expect to proceed with the next steps for redemption of the digital lottery ticket such as described below. This ticket validation approval can be in the form of one or more electronic data packets or other suitable format.

Responsive to the central server determining that the digital lottery ticket is valid and redeemable, the central server sends, via the second electronic communication network, the ticket validation SMS with data representing the one-time code to the player mobile telephone, as indicated by block 520.

Responsive to the player mobile telephone receiving, via the second electronic communication network, the ticket validation SMS with the data representing the one-time code, the player mobile telephone enables the player to cause the display device of the player mobile telephone to display the one-time code on the display device of the player mobile telephone, as indicated by block 522.

This one-time code is then provided to and entered into the access terminal along with the player's PIN that is additionally provided by the player for entry into the access terminal, as indicated by block 524. This can be done in any one of a plurality of different manners in accordance with the present disclosure. For example, the operator of the access terminal can use a suitable scanning device of the access terminal to scan the displayed one-time code and/or a player's PIN displayed by the display device of the player mobile telephone. Alternatively, the player can orally provide the one-time code and/or the player's PIN to the operator of the access terminal. Alternatively, the player can enter the one-time code and/or player's PIN directly into the access terminal (using a suitable input device of the access terminal). In alternative embodiments, this player data is data other than a player's PIN. In further alternative embodiments, no such player data is required.

Responsive to receiving the one-time code and the player's PIN, the access terminal creates an electronic player ticket redemption request with data representing the digital lottery ticket ID code, the received one-time code, and the received player's PIN, as indicated by block 526. This player ticket redemption request can be in the form of one or more electronic data packets or other suitable format.

The access terminal then sends, via the first electronic communication network, this player ticket redemption request to the central sever, as indicated by block 528.

The central server receives, via the first electronic communication network, this player ticket redemption request, as indicated by block 530.

Responsive to receiving this player ticket redemption request, the central server uses the data of the player ticket redemption request to determine whether to approve or deny the player ticket redemption request, as indicated by block 532. This approval or denial determination method includes determining that the one-time code provided by the central sever is associated with the digital lottery ticket (that the central server created and sent) and verifying the player's PIN as the correct player PIN for the player associated with the digital lottery ticket.

Responsive to the central server determining that the player ticket redemption request is not approved, the central server creates and sends, via the first electronic communication network, an electronic ticket redemption denial to the access terminal, as indicated by block 534. This ticket redemption denial can be in the form of one or more electronic data packets or other suitable format. This ticket redemption denial causes the access terminal or the operator of the access terminal to inform the player that the digital lottery ticket is not redeemable and the reason therefore. It should be appreciated that in such case, a suitable dispute resolution process can be provided. It should also be appreciated that this ticket redemption request process can be repeated a designated quantity of times in case there is an error in the input, communication, or otherwise in the one-time code or the player's PIN.

Responsive to the central server determining that the player ticket redemption request is approved, the central server creates and sends, via the first communication network, an electronic ticket redemption approval to the access terminal, as indicated by block 536. This ticket redemption approval can be in the form of one or more electronic data packets or other suitable format.

Responsive to receiving, via the first electronic communication network, this ticket redemption approval from the central server, the access terminal enables or facilitates the payment of the award for the winning digital lottery ticket to the player, as indicated by block 538. This ticket redemption approval is a confirmation that the digital lottery ticket is owned by the player requesting to redeem that digital lottery ticket and of the amount of the award. This confirmation enables the operator of the access terminal to pay the player any award for the winning digital lottery ticket.

It should be appreciated from the above that in various example embodiments of the present disclosure, the digital lottery ticket system of the present disclosure does not require a digital voucher to purchase, validate, or redeem a purchased digital lottery ticket. Rather, the digital lottery ticket itself (purchased without using a voucher) is used for validation and redemption of the digital lottery ticket. Thus, in these embodiments, the multi-step validation and redemption method disclosed herein can be used for a digital lottery ticket purchased directly without using a voucher. In other embodiments, the digital lottery ticket itself can be purchased using a voucher. In these embodiments, the multi-step validation and redemption method disclosed herein can be used for a digital lottery ticket purchased using a voucher.

In various alternative example embodiments of the present disclosure, the player mobile telephone and the respective access terminal can communicate via other suitable communication method such as but not limited to near field communication methods.

As indicated above, in certain embodiments, the player mobile telephone number is used at the time of digital lottery ticket purchase. Also, as indicated above, in certain embodiments, the player mobile telephone number is used at the time of digital lottery ticket validation and redemption. As further indicated above, in certain embodiment, the player telephone number is embedded and encrypted inside the data associated with the digital lottery ticket (either in the ticket barcode or in the data in the central server associated with the digital lottery ticket identified by a suitable code). If the player intends to change the player mobile telephone number or wants to further secure the digital lottery ticket, in various embodiments, the digital lottery ticket system can provide the player an option to upgrade the player's system account from a registration with just the mobile telephone phone number, name, age, and residence, to a more robust registration where the player can recover and prove the player is the owner of a digital lottery ticket via other suitable data provided to the digital lottery ticket system during an upgraded registration process.

In various embodiments of the present disclosure, certain of the data transmitted can be encrypted for transmission via the data networks and unencrypted after receipt via a data network. In various embodiments of the present disclosure, certain data can be encrypted on the digital lottery ticket itself. For example, the player mobile telephone number, player name, player age, player residence, or other player information may be encrypted.

The above-described embodiments of the present disclosure may be implemented in accordance with or in conjunction with one or more of a variety of different types of systems, such as, but not limited to, those described below. The present disclosure contemplates a variety of different systems each having one or more of a plurality of different features, attributes, or characteristics. A system as used herein refers to various configurations of one or more servers, controllers, or other computer systems.

In various embodiments, the redemption and validation process may be done at lottery office location using a lottery office system at that location instead of lottery system access terminal at retailer location.

In various embodiments of the present disclosure, the central server and the player mobile telephones are configured to communicate through a suitable electronic data network. In certain embodiments, the electronic data network is a local area network (LAN). In certain embodiments, the electronic data network is a wide area network (WAN). In certain embodiments, the electronic data network is an internet (such as the Internet) or an intranet. In certain embodiments, the electronic data network is a private secured network. In certain embodiments, the electronic data network is an telecommunication network.

In various embodiments of the present disclosure, the central server and the access terminals are configured to communicate through a suitable electronic data network. In certain embodiments, the electronic data network is a local area network (LAN). In certain embodiments, the electronic data network is a wide area network (WAN). In certain embodiments, the electronic data network is an internet (such as the Internet) or an intranet. In certain embodiments, the electronic data network is a private secured network. In certain embodiments, the electronic data network is an telecommunication network.

In various embodiments of the present disclosure, each of the central server and the access terminals are configured to connect to the respective electronic data network in a suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium.

In various embodiments of the present disclosure, the central server has one or more processors. Each processor is a suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information) via a communication interface; (2) converting signals read by an interface to a format corresponding to that used by software or memory; (3) accessing memory to configure or reconfigure parameters in the memory; (4) communicating with interfaces and the peripheral devices (such as input/output devices); and/or (5) controlling the peripheral devices.

In various embodiments of the present disclosure, the central server includes one or more memory devices that may include: (1) volatile memory (such as non-volatile RAM, magnetic RAM, ferroelectric RAM, and any other suitable forms); (2) non-volatile memory (such as disk memory, FLASH memory, EPROMs, EEPROMs, memristor-based non-volatile solid-state memory, etc.); (3) unalterable memory (such as EPROMs); (4) read-only memory; and/or (5) one or more secondary memory storage devices. Any other suitable magnetic, optical, and/or semiconductor memory may operate in conjunction with or as part of the systems of the present disclosure.

It will be appreciated that aspects of the present disclosure may be illustrated and described herein in any of a number of patentable classes or context including any new and useful method, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

Aspects of the present disclosure are described herein with reference to flowchart illustrations and/or block diagrams of methods, apparatuses (systems and devices) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In various embodiments of the present disclosure, the respective memory device is configured to store program code and instructions executable by the respective processor. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium.

In various embodiments of the present disclosure, the respective memory device stores authentication and/or validation components configured for authentication/validation of specified components and/or information, such as hardware components, software components, firmware components, peripheral device components, user input device components, information received from one or more player devices, information stored in the respective memory device.

While any wagers and any awards are described herein as amounts of monetary currency, such wagers and such awards may be non-monetary in accordance with the present disclosure.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention claimed is:

1. A digital lottery ticket system comprising:
a processor; and
a memory device storing a plurality of instructions that when executed by the processor, cause the processor to:
receive, via a first electronic communications network, a player ticket validation request from a lottery system access terminal, the player ticket validation request comprising data associated with data obtained from an image of a digital lottery ticket displayed by a player mobile electronic access device;
responsive to receiving the player ticket validation request, determine if the digital lottery ticket is valid and redeemable;
responsive to determining that the digital lottery ticket is valid and redeemable, create and send, via a second electronic communications network, a ticket validation SMS with data representing a one-time code to the player mobile electronic access device;
receive, via the first electronic communications network, a player ticket redemption request from the lottery system access terminal, the player ticket redemption request comprising data representing a digital lottery ticket identification, the one-time code, and a player code;
responsive to receiving the player ticket redemption request, determine based on the data representing the digital lottery ticket identification, the one-time code, and the player code, whether to approve or deny the player ticket redemption request; and
responsive to determining to approve the player ticket redemption request, create and send, via the first electronic communications network, a ticket redemption approval to the lottery system access terminal to approve payment of an award for the digital lottery ticket and to cause the lottery system access terminal to display an indication of an approval of the payment of the award for the digital lottery ticket.

2. The digital lottery ticket system of claim 1, wherein the data obtained from the image of the digital lottery ticket displayed by the player mobile electronic access device comprises data representing the digital lottery ticket identification code.

3. The digital lottery ticket system of claim 1, wherein determining if the digital lottery ticket is valid and redeemable comprises determining that the digital lottery ticket is valid, that the digital lottery ticket has not already been redeemed, and that the digital lottery ticket is associated with a player mobile telephone number.

4. The digital lottery ticket system of claim 1, wherein the plurality of instructions, when executed by the processor, cause the processor to, responsive to determining that the digital lottery ticket is either not valid and/or not redeemable, create a ticket validation denial and send, via the first electronic communication network, the ticket validation denial to the lottery system access terminal.

5. The digital lottery ticket system of claim 1, wherein the plurality of instructions, when executed by the processor, cause the processor to, responsive to determining that the digital lottery ticket data is valid and redeemable, create a ticket validation approval and send, via the first electronic communication network, the ticket validation approval to the lottery system access terminal.

6. The digital lottery ticket system of claim 1, wherein the plurality of instructions, when executed by the processor, cause the processor to, responsive to the determining that the player ticket redemption request is not approved, create a ticket redemption denial and send, via the first electronic communication network, the ticket redemption denial to the lottery system access terminal.

7. The digital lottery ticket system of claim 1, wherein the ticket redemption approval confirms that the digital lottery ticket is associated with the player mobile telephone and an amount of the award.

8. The digital lottery ticket system of claim 1, which does not require a digital voucher to validate or redeem the digital lottery ticket.

9. A method of operating a digital lottery ticket system, said method comprising:
responsive to receiving, via a first electronic communications network, a player ticket validation request from a lottery system access terminal, the player ticket validation request comprising data associated with data obtained from an image of a digital lottery ticket displayed by a player mobile electronic access device, determining if the digital lottery ticket is valid and redeemable;
responsive to determining that the digital lottery ticket is valid and redeemable, creating and sending, via a second electronic communication network, a ticket validation SMS with data representing a one-time code to the player mobile electronic access device;
responsive to receiving, via the first electronic communication network, a player ticket redemption request from the lottery system access terminal, the player ticket redemption request comprising data representing a digital lottery ticket identification, the one-time code, and a player code, determining based on the data representing the digital lottery ticket identification, the one-time code, and the player code, whether to approve or deny the player ticket redemption request; and
responsive to determining to approve the player ticket redemption request, creating and sending, via the first electronic communication network, a ticket redemption approval to the lottery system access terminal to approve payment of an award for the digital lottery ticket and to cause the lottery system access terminal to display an indication of an approval of the payment of the award for the digital lottery ticket.

10. The method of operating a digital lottery ticket system of claim 9, wherein determining if the digital lottery ticket is valid and redeemable comprises determining that the digital lottery ticket is valid, that the referenced digital lottery ticket has not already been redeemed, and that the digital lottery ticket is associated with a player mobile telephone number.

11. The method of operating a digital lottery ticket system of claim 9, wherein responsive to determining that the digital lottery ticket data is either not valid and/or not redeemable, creating a ticket validation denial for that digital lottery ticket and sending, via the first electronic communication network, the ticket validation denial to the lottery system access terminal.

12. The method of operating a digital lottery ticket system of claim 9, wherein responsive to determining that the digital lottery ticket data is valid and redeemable, creating a ticket validation approval and sending, via the first electronic communication network, the ticket validation approval to the lottery system access terminal.

13. The method of operating a digital lottery ticket system of claim 9, wherein responsive to the determining that the player ticket redemption request is not approved, creating a ticket redemption denial and sending, via the first electronic communication network, the ticket redemption denial to the lottery system access terminal.

14. The method of operating a digital lottery ticket system of claim 9, wherein the ticket redemption approval confirms that the digital lottery ticket is associated with the player mobile electronic access device and an amount of the award.

15. The method of operating a digital lottery ticket system of claim 9, which does not require a digital voucher to validate or redeem the digital lottery ticket.

16. A digital lottery ticket system access terminal comprising:
   a processor; and
   a memory device storing a plurality of instructions that when executed by the processor, cause the processor to:
   create a player ticket validation request comprising data associated with data obtained from an image of a digital lottery ticket displayed by a player mobile electronic access device;
   send, via a first electronic communications network, the player ticket validation request to a central server of a digital lottery ticket system for a determination of whether the digital lottery ticket is valid and redeemable;
   create a player ticket redemption request comprising data representing a digital lottery ticket identification, a one-time code, and a player code;
   send, via the first electronic communications network, the player ticket redemption request to the central server of the digital lottery ticket system; and
   responsive to receiving a ticket redemption approval, via the first electronic communication network, display an indication of an approval of a payment of an award for the digital lottery ticket.

17. The digital lottery ticket system access terminal of claim 16, wherein the data obtained from the image of the digital lottery ticket displayed by the wherein the one-time code and the player code are obtained from the player mobile telephone comprises data representing a digital lottery ticket identification code.

18. The digital lottery ticket system access terminal of claim 16, wherein the plurality of instructions, when executed by the processor, cause the processor to, responsive to receiving a ticket validation denial for that digital lottery ticket, via the first electronic communication network, display an indication of the denial.

19. The digital lottery ticket system access terminal of claim 16, wherein the plurality of instructions, when executed by the processor, responsive to receiving a ticket redemption denial, display an indication of the denial.

20. The digital lottery ticket system access terminal of claim 16, which does not require a digital voucher to validate or redeem the digital lottery ticket.

* * * * *